United States Patent
Ruppert et al.

(10) Patent No.: US 11,591,500 B2
(45) Date of Patent: Feb. 28, 2023

(54) ADHESIVE HAVING A LONG PROCESSING TIME AND STABLE VISCOSITY

(71) Applicant: KULZER GMBH, Hanau (DE)

(72) Inventors: Klaus Ruppert, Maintal (DE); Yanyan Habeck, Groß-Zimmern (DE)

(73) Assignee: KULZER GmbH, Hanau (DE)

( * ) Notice: Subject to any disclaimer, the term of this patent is extended or adjusted under 35 U.S.C. 154(b) by 496 days.

(21) Appl. No.: 16/631,636

(22) PCT Filed: Jul. 18, 2018

(86) PCT No.: PCT/EP2018/069503
§ 371 (c)(1),
(2) Date: Jan. 16, 2020

(87) PCT Pub. No.: WO2019/016264
PCT Pub. Date: Jan. 24, 2019

(65) Prior Publication Data
US 2020/0172769 A1  Jun. 4, 2020

(30) Foreign Application Priority Data
Jul. 19, 2017 (DE) ..................... 10 2017 116 262.3

(51) Int. Cl.
| A61C 13/10 | (2006.01) |
| A61C 13/00 | (2006.01) |
| A61C 19/00 | (2006.01) |
| C08F 2/46 | (2006.01) |
| C08F 2/50 | (2006.01) |
| C08G 61/04 | (2006.01) |
| C09J 101/02 | (2006.01) |
| C09J 4/06 | (2006.01) |
| C08F 251/02 | (2006.01) |
| C08K 5/00 | (2006.01) |

(52) U.S. Cl.
CPC .............. *C09J 101/02* (2013.01); *A61C 13/10* (2013.01); *C09J 4/06* (2013.01); *C08F 251/02* (2013.01); *C08K 5/0025* (2013.01)

(58) Field of Classification Search
CPC .......... C09J 101/02; C09J 4/06; C09J 133/04; C08F 251/02; A61C 13/10; C08K 5/0025
USPC ........ 433/193, 191, 167, 25, 215; 522/6, 71, 522/189, 184, 1; 520/1
See application file for complete search history.

(56) References Cited

U.S. PATENT DOCUMENTS

| 6,114,404 A | 9/2000 | Deeken et al. |
| 2008/0108721 A1* | 5/2008 | Ha .......................... C09J 133/02 522/89 |
| 2012/0309864 A1* | 12/2012 | Ruppert ................. A01L 15/00 525/256 |

FOREIGN PATENT DOCUMENTS

| WO | 2004/083327 A1 | 9/2004 |
| WO | 2014/139932 A1 | 9/2014 |
| WO | 2019/016264 A1 | 1/2019 |

* cited by examiner

*Primary Examiner* — Jessica Whiteley
(74) *Attorney, Agent, or Firm* — Norris McLaughlin, P.A.

(57) ABSTRACT

A polymerizable adhesive composition containing an olefinically functionalized carbohydrate, a polymerizable liquid monomer, and optionally at least one polymerization initiator or initiator system is described. The adhesive composition is particularly well suited for adhering plastic components as well as is preferably provided with sufficiently long processing time for adhering artificial teeth on denture bases. The viscosity of the adhesive composition may be adjusted to the respected processing conditions.

18 Claims, 1 Drawing Sheet

ADHESIVE HAVING A LONG PROCESSING TIME AND STABLE VISCOSITY

This application is a 371 of PCT/EP2018/069503, filed Jul. 18, 2018, which claims for-eign priority benefit under 35 U.S.C. § 119 of German Patent Application No. 10 2017 116 262.3, filed Jul. 19, 2017, the disclosures of which are incorporated herein by reference.

A polymerizable adhesive composition containing an olefinically functionalized carbohydrate, a polymerizable liquid monomer, and optionally at least one polymerization initiator or initiator system is described. The adhesive composition is particularly well suited for adhering plastic components and filled plastic components as well as is preferably provided with sufficiently long processing time for adhering artificial teeth on denture bases. The viscosity of the adhesive composition may be adjusted to the respective processing conditions.

Known adhesive compositions for adhering teeth to denture bases, such as the CAD/CAM Bond product of Wieland Dental, comprise PMMA (polymethyl methacrylate) powder as well as methyl methacrylate (MMA) as the main component. A major disadvantage of the PMMA and MMA adhesives is the very short processing time as well as the fact that the viscosity of the components mixed into a paste increases over time after mixing. Besides, a primer or adhesion agent for pretreatment of the surface is normally required for these adhesive compositions.

A 2-component adhesive for adhering artificial teeth to the denture base is disclosed by WO2014/139932 A1. The adhesive is based on a methyl methacrylate component with a content of PMMA and a peroxide, as well as a second methyl methacrylate component with a tertiary amine.

There is therefore a need for an adhesive composition allowing an adhesion of artificial teeth to a denture base with sufficient strength of the adhesive bond. Preferably, the strength of the adhesive bond shall result in a cohesive fracture of the adhered components. Furthermore, there is a need for an adhesive composition having a long processing time and good processing stability which is reflected by a constant viscosity. Moreover, on the one hand, good pressure-sensitive adhesiveness before polymerization shall be provided in order to enable insertion of the artificial teeth into the denture base and their occlusion by orientation of the teeth in the articulator. Therefore, on the one hand, there was a requirement for very good pressure-sensitive adhesiveness and long processing time in order to be able to orientate the not yet finally fixed teeth to occlusion in the articulator (s. FIG. 3).

The objects of the invention are solved by an adhesive composition according to claim 1, a kit according to claim 15 as well as a method according to claim 16.

Surprisingly, it has been possible to solve the assigned object by providing an adhesive composition comprising a polymerizable liquid monomer, preferably a radically and/or photochemically polymerizable liquid monomer, such as methacrylic acid ethyl ester (EMA) or methacrylic acid methyl ester (methyl methacrylate, MMA), and a modified radically polymerizable biopolymer, such as an olefinically functionalized carbohydrate. Good pressure-sensitive adhesiveness may already be achieved with a combination of methyl methacrylate and olefinically functionalized cellulose, in particular an ester and/or ether of olefinically functionalized cellulose, in particular olefinically functionalized esters, ethers, carbamates and/or amides of a cellulose.

Compositions with conventional binders, such as polyvinyl alcohol or non-modified cellulose, do not show satisfactory adhesion properties because either the polyvinyl alcohol is not sufficiently soluble in the liquid monomer or the adhesive properties of a composition containing the non-polymerizable cellulose were insufficient although the cellulose may be dissolved in the liquid monomer, such as methyl methacrylate or ethyl methacrylate. Surprisingly, a very strong adhesive bond could be achieved with an olefinically functionalized cellulose and EMA and/or MMA.

Furthermore, it was found that the advantageous adhesive properties of the adhesive composition may be achieved by using ethyl methacrylate as monomer with at least one olefinically functionalized carbohydrate. An adhesive composition of olefinically functionalized carbohydrate and ethyl methacrylate is considerably longer processable than the tested adhesive of Wieland Dental which merely has a processing time of approximately 6 minutes whereas the adhesive composition according to the invention comprising ethyl methacrylate and acrylamido ethyl cellulose or acrylamido methyl cellulose remains processable for more than 24 hours.

Strong swelling of the PMMA in MMA and accompanying reduction of the processing time are a disadvantage of PMMA in the adhesive composition of the state of the art. Furthermore, PEMA formed from EMA is less brittle than PMMA. Another advantage is the higher boiling point of ethyl methacrylate as well as the corresponding lower vapor pressure. Overall, a storage-stable and long-time processable, cohesive adhesive composition having a very high fracture toughness may be provided with the adhesive composition according to the invention.

According to the invention, it is preferred for the liquid monomer and the olefinically functionalized carbohydrate and/or olefinically functionalized carbohydrate derivative to be coordinated such that the carbohydrate is soluble in the liquid monomer. All radically polymerizable olefinic compounds being liquid at room temperature are considered to be liquid monomers.

A composition in which the weight ratio of the at least one polymerizable liquid monomer or the liquid monomer mixture to the at least one polymerizable olefinically functionalized carbohydrate, olefinically functionalized carbohydrate derivative, in particular olefinically functionalized amide, carbamate, ester and/or ether of a carbohydrate, or mixture thereof, in particular to the olefinically functionalized cellulose, is 1:10 to 10:1, in particular 1:1 to 10:1, preferably from 2:1 to 5:1, particularly preferably 2:1 to 4:1, or about 3.2:1, is preferred.

According to a preferred embodiment, the content of double bonds in the olefinically functionalized carbohydrate, in the olefinically functionalized carbohydrate derivative or mixture thereof is from 0.1 to 20 mole %, with respect to 1 mole carbohydrate, in particular 0.1 to 15 mole %, preferably 1 to 15 mole %, preferably 5 to 15 mole %, particularly preferably 7.5 to 12.5 mole % per 1 mole carbohydrate.

A subject matter of the invention is a polymerizable adhesive composition containing at least one carbohydrate, in particular a hot- and/or auto-polymerizable adhesive composition, preferably a dental hot- and/or auto-polymerizable adhesive composition, comprising
(i) at least one polymerizable liquid monomer,
(ii) optionally at least one polymerization initiator and/or initiator system for polymerization, comprising
   1) an initiator for hot- or auto-polymerization comprising a peroxide and/or azo compound, and optionally an aromatic tertiary amine as polymerization accelerator, or 2) a redox system comprising a) a peroxide, diketone and amine or b) (i) barbituric acid or thiobarbituric acid or a barbituric acid derivative or thiobarbituric acid derivative and (ii) at least one copper salt or copper complex and (iii) at least one compound having an ionic halogen atom, and optionally
3) a photoinitiator comprising α-hydroxyketone, azo compound or acylphophineoxide, and
(iii) at least one polymerizable olefinically functionalized carbohydrate, olefinically functionalized carbohydrate derivative or mixtures thereof.

Within the scope of the invention, photochemically and/or radically polymerizable compounds are considered as polymerizable. Hot-polymerizable and/or photochemically polymerizable adhesive compositions are preferred according to an embodiment.

Preferably, the liquid monomer comprises an acrylate derivate whose boiling point at 1 bar is greater than or equal to 110° C.

The processing time of the radically polymerizable and/or photo-polymerizable adhesive composition at 20 to 23° C. preferably is greater than 15 minutes, in particular greater than 30 minutes, preferably greater than 1 h, particularly preferably greater than 5 hours. The composition according to the invention has a processing time of approximately 24 h at room temperature.

According to a further preferred embodiment, an adhesive composition comprising as (iii) an olefinically functionalized carbohydrate, olefinically functionalized carbohydrate derivative or mixtures thereof, soluble in (i). Olefinically functionalized cellulose esters, olefinically functionalized cellulose ether, olefinic esters and/or ethers of cellulose bridged over an amide or carbamate are preferred.

Moreover, an adhesive composition is preferred comprising two components A and B, wherein
(i) component A is present as paste and comprises
  (a1) at least one polymerizable liquid monomer, in particular ethyl(meth)acrylate (EMA) and/or methyl (meth)acrylate (MMA),
  (a2) at least one olefinically functionalized carbohydrate, olefinically functionalized carbohydrate derivative or mixtures thereof, soluble in (a1), and
  (a3) optionally at least one polymerization initiator, in particular a peroxide; and component B is present as paste and comprises
  (b1) at least one polymerizable liquid monomer, in particular ethyl(meth)acrylate and/or methyl(meth)acrylate,
  (b2) at least one olefinically functionalized carbohydrate, olefinially functionalized carbohydrate derivative or mixtures thereof, soluble in (i), (b1), and
  (b3) optionally at least one polymerization accelerator, in particular an tertiary amine; or
(ii) component A is present as powder and comprises
  (a1) at least one powdered olefinically functionalized carbohydrate, olefinically functionalized carbohydrate derivative or mixtures thereof, and
  (a2) optionally at least one polymerization initiator, in particular a peroxide; component B is present as liquid or paste and comprises
  (b1) at least one polymerizable liquid monomer, in particular ethyl(meth)acrylate and/or methyl(meth)acrylate, and
  (b2) optionally at least one powdered olefinically functionalized carbohydrate, olefinically functionalized carbohydrate derivative or mixtures thereof, soluble in (ii), (a1), and
  (b3) optionally at least one polymerization accelerator, in particular a tertiary amine, and
the respective component (A) and/or (B) contains in (i) and (ii) atleast one polymerization initiator or an initiator system for radical polymerization, in particular hot- or auto-polymerization, and/or for photo-polymerization.

Another subject matter of the invention is a polymerizable adhesive composition containing at least one olefinically functionalized carbohydrate, in particular a dental adhesive composition, preferably an auto-polymerizable dental adhesive composition comprising (i) 60 to 78% by weight at least one polymerizable liquid monomer, in particular comprising methacrylic acid methylester (MMA) and/or methacrylic acid ethylester (EMA) or a mixture comprising at least one of the two monomers, methacrylic acid ethylester (EMA) is preferred, (ii) 0 to 5% by weight, in particular 0.0001 to 5% by weight, in particular 0.001 to 2% by weight at least one polymerization initiator, in particular a peroxide, such as di-benzoyl peroxide, and optionally a polymerization accelerator, in particular an aromatic tertiary amine, such as 2-n-butoxyethyl-4-dimethylamino benzoate, and/or an initiator system for polymerization, and (iii) 22 to 40% by weight, in particular 21.999% by weight to 39.999 by weight at least one polymerizable olefinically functionalized carbohydrate, olefinically functionalized carbohydrate derivative or mixture thereof, in particular acrylamido methyl cellulose acetate butyrate and/or acrylamido ethyl cellulose acetate butyrate, wherein the total composition comprises 100% by weight.

The adhesive composition may be present as an auto-polymerizable 2-component adhesive composition, in particular an auto-polymerizable 2-component dental adhesive composition.

The liquid monomers according to the invention may comprise: a) at least one acrylate, acrylic acid alkyl ester, 2-alkyl acrylic acid alkyl ester, 2-aryl acrylic acid alkyl ester, 2-aryl alkyl acrylic acid alkyl ester, each independently having 1 to 20 C atoms in the alkyl group, each independently having 6 to 14 C-atoms in the aryl group, each independently having 6 to 14 C-atoms in the aryl alkyl group and each independently having 1 to 10 C-atoms in the alkyl ester group, or a mixture comprising at least two of the said monomers, and/or
b) N-alkyl- or N-alkenyl-substituted acryloyloxy carbamate having a molecular mass of less than or equal to 250 g/mol, difunctional urethane (meth)acrylate, such as UDMA, or also a multifunctional urethane (meth)acrylate, such as an oligomer or dendrimer, and/or
c) di-, tri-, tetra- or multi-functional monomer, not being urethane (meth)acrylate, or a mixture comprising at least two of the said monomers.

Preferably, the radically polymerizable liquid monomer comprises: methyl methacrylate, ethylmethacrylate, ethylene glycol dimethacrylate, butandiol dimethacrylate, hexandiol dimethacrylate, triethylene glycol dimethacrylate (TEGDMA), tetraethylene glycol dimethacrylate, diurethane dimethacrylate, bis-GMA bis(hydroxymethacryloyloxypropoxy) phenylpropane, triemethylolpropane trimethacrylate, ditrimethylolpropane tetraacrylate, propyl methacrylate, butyl methacrylate, n-hexyl methacrylate, 2-phenoxyethyl methacrylate, isobornyl methacrylate, isodecyl methacrylate, polypropylene glycol monomethacrylate, tetrahydrofuryl methacrylate, methyl acrylate, ethyl acrylate, propyl acrylate, butyl acrylate, n-hexyl acrylate, 2-phenoxyethyl acrylate, isobornyl acrylate, isodecyl acrylate, polypropylene glycol monoacrylate, tetrahydrofuryl acrylate, hydroxyethyl acrylate, hydroxypropyl acrylate, hydroxyethyl methacrylate, hydroxypropyl methacrylate, a mixture containing at least one of these (meth)acrylates.

The at least one N-alkyl- or N-alkenyl-substituted acryloxy carbamate having a molecular mass of less than or equal to 250 g/mol may comprise: a monourethane, preferably C1 to C6 alkyl acryloxyethyl carbamate, C1 to C6 alkyl acryloxypropyl carbamate, particularly preferably n-butyl acryloxyethyl carbamate.

The at least one di-functional or multi-functional urethane (meth)acrylate may be selected from a urethane dimethacrylate, preferably a bis(methacryloxy-2-ethoxycarbonylamino) alkylene, acryloxy-substituted urethane dendrimer, diurethane acrylate oligomer, urethane (meth)acrylate dendrimers, Urethane methacrylate polymer approx. 300 g/mol (dendrimer, Laromer UA9049, 50% in acrylate monomer blend (41.7% by weight HEMA-TMDI/8% by weight TEGDMA, CAS 109-16-0), alkyl-functional urethane dimethacrylate oligomers, aromatically functionalized urethane dimethacrylate oligomers, aliphatically unsaturated urethane acrylates, bis(methacryloxy-2-ethoxycarbonylamino)-substituted polyether, aromatic urethane diacrylate oligomers, aliphatic urethane diacrylate oligomers, mono-functional urethane acrylates, aliphatic urethane diacrylates, hexa-functional aliphatic urethane resins, aliphatic urethane triacrylate, UDMA, aliphatic urethane acrylate oligomer, unsaturated aliphatic urethane acrylates. Suitable urethane (meth)acrylates are available under the following brand names: Ebecryl 230 (aliphatic urethane diacrylate), Actilane 9290, Craynor 9200 (diurethane acrylate oligomer), Ebecryl 210 (aromatic urethane diacrylate oligomer), Ebecryl 270 (aliphatic urethane diacrylate Oligomer), Actilane 165, Actilane 250, Genomer 1122 (monofunctional urethane acrylate), Photomer 6210 (cas no. 52404-33-8, aliphatic urethane diacrylate), Photomer 6623 (hexa-functional aliphatic urethane resin), Photomer 6891 (aliphatic urethane triacrylate), UDMA, Roskydal LS 2258 (aliphatic urethane acrylate oligomer), Roskydal XP 2513 (unsaturated aliphatic urethane acrylate).

Preferably, the di-, tri-, tetra- or multi-functional monomer not being an urethane (meth)acrylate, or a mixture comprising at least two of the said monomers, comprises: 1,4-butandiol dimethacrylate (1,4-BDMA) or pentaerythritol tetraacrylate, bis-GMA monomer (bisphenyl-A glycidyl methacrylate), triethylene glycol dimethacrylate (TEGDMA) and diethylene glycol dimethacrylate (DEGMA), tetraethylene glycol di(meth)acrylate, decane diol di(meth)acrylate, dodecane diol di(meth)acrylate, hexyldecane diol di(meth)acrylate, trimethylolpropane tri(meth)acrylate, pentaerythritol tetra(meth)acrylate as well as butane diol di(meth)acrylate, ethylene glycol di(meth)acrylate, polyethylene glycol di(meth)acrylate, ethoxylated/propoxylated bisphenol-A di(meth)acrylates, a mixture containing at least one of these (meth)acrylate and/or co-polymers comprising one or at least two of the aforementioned monomers. It is referred to methyl, ethyl, n-propyl, i-propyl, n-butyl, t-butyl, i-butyl, benzyl and furfuryl methacrylate or mixtures thereof. Of these, methyl methacrylate is particularly preferred.

Particularly preferably, the at least one liquid monomer is selected from: acrylate, methyl (meth)acrylate (methacrylic acid methyl ester, MMA), methacrylic acid ethyl ester (EMA) ethyl acrylic acid ethyl ester, in particular methacrylic acid ethyl ester.

Preferred radically and/or photochemically polymerizable olefinically functionalized carbohydrates, olefinically functionalized carbohydrate derivatives or a mixture thereof comprises at least one olefinically functionalized di- and/or polysaccharide, olefinically functionalized di- and/or polysaccharide derivative, olefinically functionalized cellulose, olefinically functionalized cellulose derivative, olefinically functionalized starch, olefinically functionalized starch derivative, olefinically functionalized chitin, olefinically functionalized chitin derivative, in particular olefinically functionalized esters, ethers, carbamates and/or amides of the said carbohydrates. Likewise preferred are olefinic carbohydrates bifunctionally —O—, —NH— and/or —S-bridged over at least one heteroatom, olefinic carbohydrate derivatives bifunctionally —O—, —NH— and/or —S-bridged over at least one heteroatom or mixtures, such as olefinic di- and/or polysaccharides, di- and/or polysaccharide derivatives, cellulose, cellulose derivatives, cellulose ester, cellulose ether, starch, starch derivatives, chitin, chitin derivatives, in particular the derivatives comprise the respective alkyl esters and/or alkyl ethers of the carbohydrates. Olefinically functionalized cellulose, cellulose derivative or a mixture thereof is particularly preferred. The olefinically functionalized cellulose, such as an cellulose ester and/or cellulose ether, preferably is bridged with the olefinic residue over a bifunctionally bridged —N—, —O— and/or —S— containing residue.

The content of double bonds in the olefinically functionalized carbohydrate, in the olefinically functionalized carbohydrate derivative or mixture thereof, in particular in the olefinic cellulose, is from 0.1 to 20 mole %, based on 1 mole carbohydrate, in particular 0.1 to 15 mole %, preferably 1 to 15 mole %, preferably 5 to 15 mole %, particularly preferably 7.5 to 12.5 mole % per 1 mole carbohydrate.

The weight ratio of the (i) at least one polymerizable liquid monomer or the liquid monomer mixture, in particular of EMA and/or MMA, to (ii) at least one polymerizable olefinically functionalized carbohydrate, olefinically functionalized carbohydrate derivative or mixture, in particular the olefinically functionalized carbohydrates or derivatives bridged over a bifunctional group 0, NH and/or S to the carbohydrates, preferably is 1:10 to 10:1, in particular 1:1 to 10:1, preferably from 2:1 to 5:1, particularly preferably from 2:1 to 4:1, or about 3.2:1.

The olefinic group of the olefinically functionalized carbohydrates, of the olefinically functionalized carbohydrate derivatives or mixtures thereof may preferably be selected from: alkenyl group, such as allyl, vinyl alkene aryl group, unsaturated acyl group, such as fatty acid group, for example cis-9-hexadecene acid, acryloyl group, acryl group, acrylamide group, acrylamide alkyl group, 2-alkyl acryl group, 2-alkyl acryloyl group, 2-alkyl acryloyl alkyl group, wherein the alkyl group comprises 1 to 10 C-atoms, 2-alkyl acrylamide group, wherein the alkyl group comprises 1 to 10 C-atoms, or the olefinic group may selected from: at least one acryl group, 2-alkene acryl group, alkenyl group, alkenyl aryl group, unsaturated acryl group, bifunctionally bridged over at least one heteroatom selected from —O—, —NH—, and —S-atoms, in particular at least one acryl group, 2-alkene acryl group, alkenyl group, alkenyl aryl group, unsaturated acyl group, bifunctionally —O— or —NH-bridged.

An acryl alkenyl group or 2-alkyl acryl group, alkenyl group, bifunctionally —O— or —NH— bridged, wherein the respective alkyl group comprises 1 to 10 C-atoms, is preferred. Examples include (acryloyloxy alkyl) cellulose alkyl ester, (acrylamido alkyl) cellulose alkyl ester, wherein the respective alkyl group comprises 1 to 10 C-atoms, polyvinyl-functionalized cellulose, polyvinyl-functionalized cellulose esters, wherein functionalization may be made by the above bifunctional groups. Acrylamido ethyl cellulose, acrylamido ethyl cellulose esters, acrylamido methyl cellulose, acrylamido methyl cellulose esters, wherein the esters of at least one carboxylic acid have 1 to 18 C-atoms, are particularly preferred, acrylamido methyl cellulose acetate butyrate or acrylamido ethyl cellulose acetate butyrate are preferred.

Particularly preferably, the olefinically functionalized carbohydrate or olefinically functionalized carbohydrate derivative is selected from olefinically functionalized cellulose acetate butyrate, (acryloyloxy alkyl) cellulose acetate butyrate, (acrylamido alkyl) cellulose acetate butyrate, each independently having 1 to 10 C-atoms in the bifunctional alkyl group, in particular (acryloyloxy methyl) cellulose acetate butyrate, (acryloyloxy ethyl) cellulose acetate butyrate, (acrylamido ethyl) cellulose acetate butyrate and/or (acrylamido methyl) cellulose acetate butyrate. Preferably, the olefinically functionalized carbohydrate or olefinically functionalized carbohydrate derivative comprises (acrylamido methyl) cellulose acetate butyrate and/or (acrylamido ethyl) cellulose acetate butyrate.

According to a further preferred embodiment, the olefinically functionalized carbohydrate or olefinically functionalized carbohydrate derivative has a number average molecular weight distribution of Mn 1,000 to 50,000 g/mol, in particular of 5,000 g/mol to 40,000 g/mol, preferably of 10,000 g/mol (GPC), Mn 30,000 g/mol (GPC), each determined by means of GPC.

Olefinically functionalized carbohydrate derivatives further comprise ethers and/or esters of carbohydrates, in particular sugar ethers, in which the non glycosidic OH-group(s) are etherified, glycosides and sugar esters. In this context, the carbohydrates may be selected from monosaccharides, oligosaccharides, sugar alcohols, sugar acids and lactones of sugar acids. Oligosaccharides are preferably selected from oligosaccharides having at least two to 1,000 monosaccharides, ethers and/or esters of oligosaccharides having a Mn of 2,000 to 50,000 g/mol, in particular having Mn 4,000 to 40,000 g/mol, are preferably used.

According to a preferred embodiment, the adhesive composition comprises a polymerization initiator, wherein the initiator may comprise:
1) an initiator for hot- or auto-polymerization comprising a peroxide and/or an azo compound, and optionally an aromatic tertiary amine as polymerization accelerator, or
2) a redox system comprising a) a peroxide, diketone and amine or b) (i) barbituric acid or thiobarbituric acid or a barbituric acid derivative or thiobarbituric acid derivative and (ii) at least one copper salt or copper complex and (iii) at least one compound having an ionic halogen atom, and/or
3) a photoinitiator comprising α-hydroxyketone, azo compound or acylphophineoxide.

The following initiators and/or initiator systems for auto- or cold-polymerization comprise
a) at least one initiator in particular at least one peroxide and/or azo compound, in particular LPO: dilauroyl peroxide, BPO: dibenzoyl peroxide, t-BPEH: tert-butylper-2-ethyl hexanoate, AIBN: 2,2'-azobis-(isobutyronitrile), DTBP: di-tert-butyl peroxide, and optionally
b) at least one polymerization accelerator, in particular at least one aromatic amine, such as 2-n-butoxyethyl-4-(dimethylamino) benzoate, N,N-dimethyl-p-toluidine, N,N-dihydroxyethyl-p-toluidine and/or p-dibenzylamino benzoic acid diethyl ester, or
c) at least one initiator system selected from redox systems, in particular a combination selected from 1) dibenzoyl peroxide and/or dilauroyl peroxide and camphorquinone with amines selected from 2-n-butoxyethyl-4-(dimethylamino) benzoate, N,N-dimethyl-p-toluidine, N,N-dihydroxyethyl-p-toluidine and p-dimethylamino benzoic acid diethyl ester, or
2) a redox system comprising a peroxide, and a reducing agent selected from ascorbic acid, ascorbic acid derivative, barbituric acid or a barbituric acid derivative, sulphinic acid, sulphinic acid derivative, a redox system comprising (i) barbituric acid or thiobarbituric acid or a barbituric acid derivative or thiobarbituric acid derivative and (ii) at least one copper salt or copper complex and (iii) at least one compound having an ionic halogen atom is particularly preferred, a redox system comprising 1-benzyl-5-phenyl barbituric acid, copper acetylacetonate, triazine derivative, toluidine derivative and/or benzyl dibutyl ammonium chloride is particularly preferred. Particularly preferably, the polymerization in the 2-component denture base material is initiated by a barbituric acid derivative.

Preferably, the initiator system is a redox system selected from the two components, with component 1 comprising a peroxide, and a reducing agent selected from ascorbic acid, ascorbic acid derivative, barbituric acid or a barbituric acid derivative, sulphinic acid, sulphinic acid derivative, a redox system comprising (i) barbituric acid or thiobarbituric acid or a barbituric acid derivative or thiobarbituric acid derivative and components 2 comprising at least one copper salt or copper complex and (iii) at least one compound having an ionic halogen atom is particularly preferred, particularly preferably a redox system comprising 1-benzyl-5-phenyl barbituric acid, copper acetylacetonate, triazine derivative, toluidine derivative and/or benzyl dibutyl ammonium chloride is selected, wherein component 1 and component 2 are present separated from each other in components A) and B). Likewise, the redox system may comprise two components 1 and 2, wherein component 1 comprises dibenzoyl peroxide and/or dilauroyl peroxide and optionally camphorquinone and components 2 comprises amines, in particular selected from 2-n-butoxyethyl-4-(dimethylamino) benzoate, N,N-dimethyl-p-toluidine, N,N-dihydroxyethyl-p-toluidine and p-dimethylamino benzoic acid diethyl ester.

The adhesive composition according to the invention may have a viscosity of 50 to 5000 mPa·s. It is particularly advantageous that the viscosity of the composition may be adjusted depending on the application, it may thus have a low viscosity of 50 to 100 mPa·s, a medium viscosity of 300 to 600 mPa·s, preferably about 450 mPa·s with +/−25 mPa·s, or a high viscosity of 1500 to 2000 mPa·s, depending on the application. A high viscosity may be advantageous for the first pressure-sensitive adhesive attachment of artificial teeth in the cavity of the denture base in order to adjustably position the teeth in the cavity. A low viscosity allows filling of marginal gaps between the cavity margins and the artificial teeth with the adhesive composition.

In addition, the adhesive composition may comprise as further component (iv) at least one powdered component of polymeric particles comprising polymethyl methacrylate (PMMA) for further adjustment of the viscosity. Preferably, the powdered component is present in the mixture with the olefinically functionalized carbohydrate or olefinically functionalized carbohydrate derivative.

Likewise preferred is a kit comprising a 2-component adhesive composition, in particular an auto-polymerizable 2-component dental adhesive composition, comprising
A) at least one polymerizable liquid monomer component,
B) at least one olefinically functionalized carbohydrate or olefinically functionalized carbohydrate derivative or mixture thereof, wherein the adhesive composition contains in component (A) and/or (B)

(i) at least one polymerization initiator and optionally a polymerization accelerator or an initiator system for auto-polymerization.

As shown by the following exemplary embodiments, dental adhesions may be achieved with the adhesive composition according to the invention resulting at least in part in cohesive fracture to complete cohesive fracture of the adhered artificial tooth, when adhesion is determined according to DIN 13998 (D) which serves for determination of bonding strength between plastic tooth and denture base.

Thus, another subject matter of the invention is a method for adhering at least parts of an artificial tooth, preferably of artificial teeth, in respectively one cavity for receiving an artificial tooth of a dental denture base, comprising the steps of:

a) using a higher viscous hot- or auto-polymerizable adhesive composition for positioning and orientation of respectively one artificial tooth in the cavity for receiving the artificial tooth, and b) using a lower viscous photo-polymerizable adhesive composition for filling the marginal gap formed between the tooth and the cavity margin, by, in step a) (i) inserting the hot- or auto-polymerizable adhesive composition in the respective cavity, in particular in a defined amount of the adhesive not leaking out from the cavity after insertion and pressing of the respective artificial tooth into the respective cavity, or (ii) providing the basal side of the respective artificial tooth with the hot- or auto-polymerizable adhesive composition, in particular having a viscosity of 800 to 2000 mPa·s, and
  inserting the respective tooth with the basal side into the respective cavity of the dental denture base, and
  optionally positioning and orientating the tooth in the respective cavity, and b) (i) optionally filling the marginal gap formed between the cavity margin of the respective cavity and the respective tooth inserted with a polymerizable adhesive composition, in particular with a low-viscous adhesive composition, preferably having a viscosity of 50 bis 100 mPa·s, particularly preferably insertion may be made via a cannula, optional filling the marginal gap formed between the cavity margin of the respective cavity and the respective tooth inserted with an auto- and/or photo-polymerizable adhesive composition is preferred, (ii) optionally polymerizing, in particular photo-polymerizing and/or auto-polymerizing and optionally hot-polymerizing of the adhesive composition and preferably obtaining of a denture base with artificial teeth being arranged in the cavities of the denture base with a polymerizable adhesive composition.

Polymerization of the photo-polymerizable adhesive composition may be performed by means of UV and/or VIS light in order to polymerize the adhesive composition at least in part. Subsequently, complete polymerization of the hot- and/or auto-polymerizable as well as optionally photo-polymerizable adhesive composition may be performed at elevated temperature. Processing time of the auto-polymerizable adhesive composition may be adjusted by choosing the appropriate initiator or initiator system.

A subject matter of the invention is also a denture base with adhered artificial teeth obtainable according to the method according to the invention.

According to a further preferred embodiment, a subject matter of the invention is the use of the adhesive composition or of the kit for adhering of plastics, filled plastics, mineral substrates, metallic substrates, in particular of dental plastics, dental filled plastics, dental mineral substrates and/or dental metallic substrates. Likewise a subject matter of the invention is the use of the adhesive composition or of the kit for adhering of dental, medical or surgical prosthetic parts, such as denture bases with artificial teeth, crowns, abutments, bars, dental superstructures, dental veneers, implants, such as dental or surgical implants, or surgical prostheses, such as parts of bones, jawbones, joints; technical components, electronic components, of automotive components, computer components, such as displays, parts of smartphones.

An olefinically functionalized carbohydrate or carbohydrate derivative being soluble in the at least one radically polymerizable monomer is understood to mean a carbohydrate which dissolves in said polymerizable monomer by at least 10 g/l, preferably by at least 25 g/l, particularly preferably by at least 50 g/l and more particularly preferably by at least 100 g/l (at room temperature 20° C.).

Usually, the amount of the polymer being soluble in the radically polymerizable monomer in the adhesive composition according to the invention is in the range of 1 to 85% by weight, based on the total weight of the adhesive composition. Accordingly, the content of organic polymer may be, each independently, 1 to 85% by weight in one of the below pastes A, B and/or liquid B as well as the powdered component A, based on the respective total composition of paste, liquid or powdered component.

The invention is clarified by the following examples without restricting the invention to these examples.

EXEMPLARY EMBODIMENTS AND MEASURING METHODS

Viscosity

| Measuring device: | Measuring system: |
|---|---|
| Rheometer: Anton Paar - Physica MCR 301 | Plate/Plate Measuring system Measuring plate PP50 |
| Rotation time experiment: | Measuring profile: (presettings) |
| Measuring gap = 0.2 mm<br>Measuring temperature = 20° C. | Shear rate d(gamma)dt = 10 1/s constant<br>Timing = 20 measuring points<br>Measuring point duration = 2 seconds<br>Waiting time until experiment is started = 1 minute |

Analysis:

Creating a mean value graph from single measurements; calculation type=arithmetic average; 2. averaging of all data points of the mean value graph; calculation of the viscosity in [mPa·s] at 20° C.

Adhesion or cohesion was determined according to DIN 13998 (2012) using a Zwick 2010 apparatus, wherein, deviating from the standard, pure cohesion fracture was sought. The adhesive composition comprising the powder or the olefinically functionalized carbohydrate or derivative, respectively, contains as polymerization initiator and polymerization accelerator Speedcure BEDB (2-n-Butoxyethyl-4-(dimethylamino)benzoate) and Perkadox L-DFG (Di-Benzoyl peroxide). The fracture toughness was determined using a Zwick 2010 machine referring to DIN 13998.

TABLE 1

Comparison of the fracture toughness of adhesion as well as of the processing times

| Mixture | Powder | Liquid | processing time [h] | Shear bond strength Fracture toughness $F_{max}$ [N] |
|---|---|---|---|---|
| 1 | Jaylink 103M[*] (polymerizable cellulose) | EMA | 24 h | 449 cohesive fracture |
| 2 | Jaylink 103M (polymerizable cellulose) | MMA | — | 192 partially cohesive fracture |
| 3 | PMMA $M_w$ 332 | MMA | 9 min | 319 cohesive fracture |
| 4 | Cellulose Ethocel std. 45 Premium (non polymerizable cellulose) | EMA | — | 115 adhesive fracture |
| 5 | PMMA $M_w$ 332: Jaylink 103M (7:1) | MMA | 15 min | 294 cohesive fracture |
| 6 | Wieland dental CAD CAM bond | MMA | 6-10 min | 209 partially cohesive fracture |

[*]Jaylink 103M $M_n$ approx. 10,000 g/mol

From the results in Table 1 it can be seen that good fracture strengths may be achieved with the mixtures of olefinically functionalized cellulose and methylmethacrylate or ethylmethacrylate. In addition, with the adhesive composition in the combination ethylmethacrylate with olefinically functionalized cellulose, on the one hand, the processing time could be quite significantly extended to 24 hours and, at the same time, the fracture toughness could be increased to $F_{max}$=449 [N] resulting in a pure cohesive break.

TABLE 2

Estimation of the processing time in hours [h] of the first mixture in Table 1 by viscosity measurements

| | Period after production of the mixture | | | | |
|---|---|---|---|---|---|
| | 0 h | 0.5 h | 1.5 h | 3.5 h | 24 h |
| Viscosity (mPa · s) | 448.7 | 452.3 | 455.4 | 441.3 | Gelation |

A mixture of 1 to 14 g cellulose to EMA in weight ratio 1:3.2 was produced, which is classified as medium viscous (450 mPa·s). The viscosity of 14 g of the mixture was determined immediately after addition of the initiator and the accelerator Perkadox L-DFG and Speedcure BEDB at 20° C. using viscosimeter Anton Paar Physica MCR301 rheometer from a shear rate of 10 (1/s) on.

The preceding measurement results merely show negligible change of the viscosity within the first 3.5 hours. In further experiments, initiator was added to 2.3 g of mixture 1 visually confirming this result. The adhesive was still applicable after 24 h.

A pre-mixture comprising olefinically functionalized cellulose to EMA in weight ratio of 1:3,2 having a content of 2% by weight amine(s) was stored for one month at 27° C. and change of the viscosity was determined, see Table 3. No change was observed over a period of 8 weeks.

TABLE 3

Viscosity measurements in hours [h] and weeks [w]

| | Period after production of the mixture | | | | |
|---|---|---|---|---|---|
| | 0 h | 1 w | 2 w | 4 w | 8 w |
| Viscosity (mPa · s) | 586.2 | 576.2 | 562.3 | 569 | Visually no change. |

BRIEF DESCRIPTION OF THE DRAWINGS

FIG. 1: Cohesive fracture of a composition 3 (mixture 1) at broken tooth 6
FIG. 2: Adhesive and cohesive fracture of another composition 4 (mixture 2) at tooth 7
FIG. 3: Articulator 5 for determining the occlusion
FIG. 4: Schematic representation of the adhesion of an artificial tooth with a highly viscous adhesive 2 and a low viscous adhesive 1.

Figure 1:
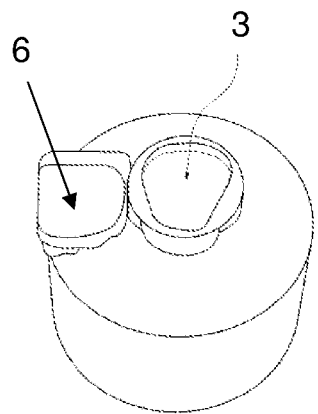
FIGS. 1 to 4 show.
Figure 2:
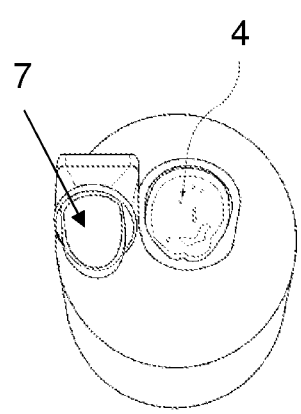
Figure 3:
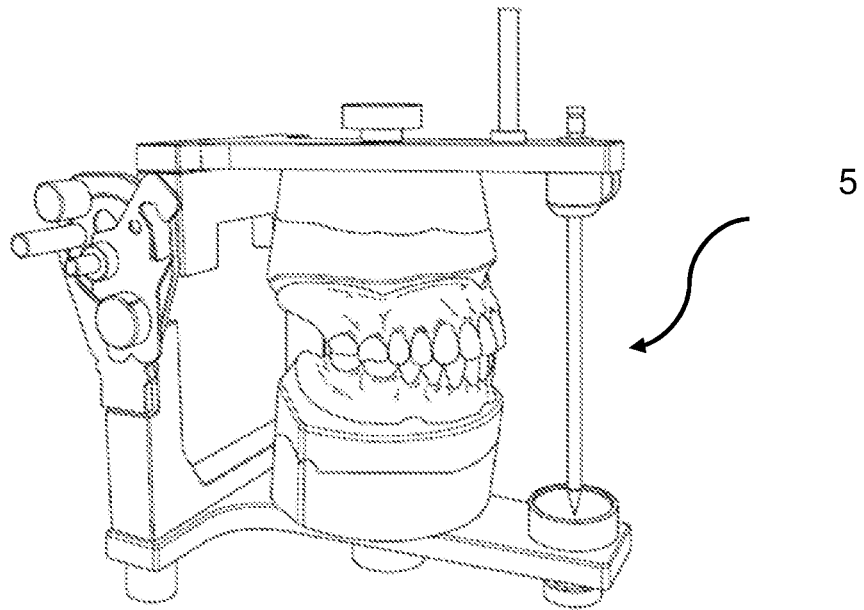
Figure 4:
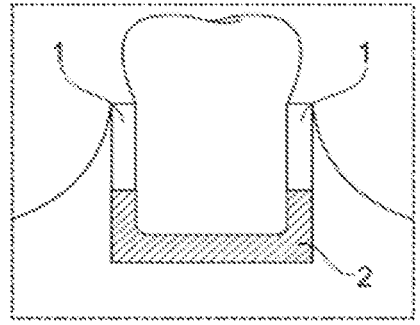

The invention claimed is:
1. Polymerizable dental hot- and/or polymerisable adhesive composition containing at least one carbohydrate comprising
   (i) at least one polymerizable liquid monomer, which comprises
   (ii) at least one polymerization initiator and/or initiator system for polymerization, containing
      1. An initiator for hot- or auto-polymerization comprising a peroxide and/or azo compound, and optionally an aromatic tertiary amine as polymerization accelerator, or
      2. A redox system comprising a) a peroxide, diketone and amine or b) (i) barbituric acid or thiobarbituric acid or a barbituric acid derivative or thiobarbituric acid derivative and
         (ii) at least one copper salt or copper complex and (iii) at least one compound having an ionic halogen atom, and optionally
      3. A photoinitiator comprising a-hydroxyketone, azo compound or acylphosphineoxide, and
   (iii) at least one polymerizable olefinically functionalized carbohydrate, olefinically functionalized carbohydrate derivative or mixtures thereof,
   wherein the composition has a viscosity of 50 to 5000 mPa·s.
2. Adhesive composition according to claim 1, wherein
   (iii) is an olefinically functionalized carbohydrate, olefinically functionalized carbohydrate derivative, or mixtures thereof, soluble in (i).
3. Adhesive composition according to claim 1, wherein
   the composition comprises two components A and B,
   (i) component A being present as paste and comprising
      (a1) at least one polymerizable liquid monomer,

(a2) at least one olefinically functionalized carbohydrate, olefinically functionalized carbohydrate derivative or mixtures thereof, soluble in (a1), and component B being present as paste and comprising (b1) at least one polymerizable liquid monomer, (b2) at least one olefinically functionalized carbohydrate, olefinically functionalized carbohydrate derivative or mixtures thereof, soluble in (i), (b1), or (ii) component A being present as paste and comprising (a1) at least one powdered olefinically functionalized carbohydrate, olefinically functionalized carbohydrate derivative or mixtures thereof, and component B being present as liquid or paste and comprising (b1) at least one polymerizable liquid monomer, and (b2) optionally at least one powdered olefinically functionalized carbohydrate, olefinically functionalized carbohydrate derivative or mixtures thereof, soluble in (ii), (a1), and the respective component (A) and/or (B) contains in (i) and (ii) at least one polymerization initiator or an initiator system for radical polymerization, and/or for photo-polymerization.

4. Adhesive composition according to claim 1, wherein the polymerizable liquid monomer comprises a) at least one acrylate, acrylic acid alkyl ester, alkyl 2-acrylic acid alkyl ester, aryl 2-acrylic acid alkyl ester, aryl alkyl 2-acrylic acid alkyl ester, each independently having 1 to 20 C-atoms in the alkyl group, each independently having 6 to 14 C-atoms in the aryl group, each independently having 6 to 14 C-atoms in the aryl alkyl group and each independently having 1 to 10 C-atoms in the alkyl ester group, or a mixture comprising at least two of the said monomers, and/or b) N-alkyl- or N-alkenyl-substituted acryloyloxy carbamate having a molecular mass of less than or equal to 250 g/mol, difunctional urethane (meth)acrylate, multifunctional urethane (meth)acrylate oligomer or also dendrimer, and/or c) di-, tri-, tetra- or multi-functional monomer, not being urethane (meth)acrylate, or a mixture comprising at least two of the said monomers.

5. Adhesive composition according to claim 1, wherein the polymerizable liquid monomer comprises at least one acrylate selected from acrylate, methyl (meth)acrylate (MMA), methacrylic acid ethyl ester (EMA), and ethyl acrylic acid ethyl ester.

6. Adhesive composition according to claim 1, wherein the polymerizable olefinically functionalized carbohydrate, olefinically functionalized carbohydrate derivative or mixture thereof comprises at least one olefinically functionalized di- and polysaccharide, olefinically functionalized di- and polysaccharide derivative, olefinically functionalized cellulose, olefinically functionalized cellulose derivative, olefinically functionalized starch, olefinically functionalized starch derivative, olefinically functionalized chitin and/or olefinically functionalized chitin derivative.

7. Adhesive composition according to claim 1, wherein the polymerizable olefinically functionalized carbohydrate, olefinically functionalized carbohydrate derivative or mixture thereof comprises an olefinically functionalized cellulose, cellulose derivative or a mixture thereof.

8. Adhesive composition according to claim 1, wherein the polymerizable olefinically functionalized carbohydrate, olefinically functionalized carbohydrate derivative or mixture thereof comprises alkenyl group, alkenyl aryl group, unsaturated acyl group, acryloyl group, acryl group, acrylamide group, 2-alkyl acryl group, 2-alkyl acryloyl group, wherein the alkyl group comprises 1 to 10 C-atoms, 2-alkyl acrylamide group, wherein the alkyl group comprises 1 to 10 C-atoms, as at least one olefinic group, or at least one acryl group, 2-alkene acryl group, alkenyl group, alkenyl aryl group, unsaturated acryl group, bridged over at least one bifunctional heteroatom selected from O—, N—, and S— atoms.

9. Adhesive composition according to claim 1, wherein the olefinically functionalized carbohydrate or olefinically functionalized carbohydrate derivative comprises olefinically functionalized cellulose acetate butyrate, (acryloyloxy alkyl) cellulose acetate butyrate, (acrylamido alkyl) cellulose acetate butyrate, each independently having 1 to 10 C-atoms in the bifunctional alkyl group.

10. Adhesive composition according to claim 1, wherein the olefinically functionalized carbohydrate or olefinically functionalized carbohydrate derivative is selected from (acrylamido methyl) cellulose acetate butyrate or (acrylamido ethyl) cellulose acetate butyrate.

11. Adhesive composition according to claim 1, wherein the olefinically functionalized carbohydrate or olefinically functionalized carbohydrate derivative has a number average molecular weight distribution of Mn 1,000 to 50,000 g/mol, each determined by means of GPC.

12. Adhesive composition according to claim 1, wherein the adhesive composition is a dental hot- or auto-polymerizable adhesive composition, comprising (i) 60 to 78% by weight at least one polymerizable liquid monomer, (ii) 0 to 5% by weight at least one polymerization initiator, and (iii) 22 to 40% by weight at least one polymerizable olefinically functionalized carbohydrate, olefinically functionalized carbohydrate derivative or mixture thereof, wherein the total composition equates to 100% by weight.

13. Adhesive composition according to claim 1, wherein the composition has a viscosity of 50 to 600 mPa·s, or a high viscosity of 1500 to 2000 mPa·s, depending on the application.

14. Adhesive composition according to claim 1, wherein the composition is an auto-polymerizable 2-component adhesive composition.

15. Kit comprising a 2-component adhesive composition according to claim 3, comprising A) at least one polymerizable liquid monomer component, B) at least one olefinically functionalized carbohydrate or olefinically functionalized carbohydrate derivative or mixture thereof, wherein
the adhesive composition contains in component (A) and/or (B)
(i) at least one polymerization initiator and optionally a polymerization accelerator or an initiator system for auto-polymerization.

16. Method for adhering artificial teeth in respectively one cavity for receiving of at least parts of an artificial tooth in a dental denture base, comprising the steps of:
   a) using a higher viscous hot- or auto-polymerizable adhesive composition (2) for positioning and orientation of respectively one artificial tooth in a cavity for receiving an artificial tooth, and
   b) using a lower viscous photo-polymerizable adhesive composition (1) for filling the marginal gap formed between the tooth and the cavity margin,
by, in step
   a) (i) inserting the hot- or auto-polymerizable adhesive composition according to claim 1 in the respective cavity is made,
   (ii) providing the basal side of the respective artificial tooth with the hot- or auto-polymerizable adhesive composition, and
      inserting the respective tooth with the basal side into the respective cavity of the dental denture base, and
      optionally positioning and orientating the tooth in the respective cavity, and
   b) (i) optionally filling the marginal gap formed between the cavity margin of the respective cavity and the respective tooth inserted with a photo-polymerizable adhesive composition.

17. Method of using the adhesive composition according to claim 1, said method comprising adhering said adhesive composition to plastics, filled plastics, mineral substrates, metallic substrates, dental plastics, dental filled plastics, dental mineral substrates and/or dental metallic substrates, dental, medical or surgical prosthetic parts, technical components, electronic components, of automotive components, or computer components.

18. Method of using the kit according to claim 15, said method comprising adhering the 2-component adhesive composition to plastics, filled plastics, mineral substrates, metallic substrates, dental plastics, dental filled plastics, dental mineral substrates and/or dental metallic substrates, dental, medical or surgical prosthetic parts, technical components, electronic components, of automotive components, or computer components.

* * * * *